's Patent [19]

Thigpen

[11] 4,041,443
[45] Aug. 9, 1977

[54] SEISMIC RECORDING APPARATUS HAVING A TIME-VARYING SAMPLE

[75] Inventor: Ben B. Thigpen, Houston, Tex.

[73] Assignee: Western Geophysical Co. of America, Houston, Tex.

[21] Appl. No.: 691,795

[22] Filed: June 1, 1976

[51] Int. Cl.² .............................................. G01V 1/28
[52] U.S. Cl. .................... 340/15.5 AF; 340/15.5 MC; 340/15.5 TC; 340/15.5 DP; 340/15.5 F
[58] Field of Search ......... 340/7 R, 15.5 MC, 15.5 F, 340/15.5 DP, 15.5 AF, 15.5 TC; 179/15 B, 15 AA

[56] References Cited

U.S. PATENT DOCUMENTS

| | | | |
|---|---|---|---|
| 3,349,866 | 10/1967 | Mifsud | 340/15.5 MC |
| 3,613,071 | 10/1971 | Quay | 340/15.5 MC |
| 3,719,924 | 3/1973 | Muir et al. | 340/15.5 MC |
| 3,747,056 | 7/1973 | Treybig et al. | 340/15.5 MC |
| 3,775,738 | 10/1973 | Quay et al. | 340/15.5 MC |
| 3,833,772 | 9/1974 | Getgen | 179/15 AA |
| 3,836,720 | 9/1974 | Getgen | 179/15 AA |
| 3,859,469 | 1/1975 | Getgen | 179/15 AA |
| 3,988,712 | 10/1976 | Ezell et al. | 340/15.5 MC |

OTHER PUBLICATIONS

IBM Technical Disclosure Bulletin, (8, No. 1, 6/75) p. 101 Thrasher.
IBM Journal, 3/65 pp. 137–140, Thrasher.

Primary Examiner—Samuel W. Engle
Assistant Examiner—S. A. Cangialosi
Attorney, Agent, or Firm—William A. Knox

[57] ABSTRACT

The apparatus provides a means for time-varying the signal sample rate and the subsurface coverage during a single seismic reflection recording cycle. A number of seismic sensor arrays are connected to a multichannel seismic recording apparatus through a data-signal transmission means such as a multiconductor cable or a telemetric link. Each seismic sensor array is, of course, connected to a corresponding input channel, including a preamplifier, in the multichannel recording apparatus. Included in the recording apparatus is a set of addressable multiplexer switches. The multiplexer switches (or for simplicity, simply multiplexers) are divided into at least two groups. Separate sets of anti-aliasing filters, each set having a different pass band, are connected to the input terminals of the respective subgroups of multiplexers. One half of the input channels are connected to both sets of filters; all of the input channels are connected to one set of filters and multiplexers.

23 Claims, 5 Drawing Figures

| SAMPLE NUMBER | S-1 | S-2 | S-3 | S-4 | S-5 | S-6 | S-7 | S-8 | S-9 | S-10 | S-11 | S-12 | S-13 | S-14 | S-15 | S-16 |
|---|---|---|---|---|---|---|---|---|---|---|---|---|---|---|---|---|
| TIME ZONE ONE CHANNEL SAMPLED | --- | --- | --- | --- | --- | --- | --- | --- | A-1 | C-1 | C-2 | C-3 | A-2 | C-1 | C-2 | C-3 |
| SWITCH ADDRESSED | SYNC. | C-1 | C-2 | C-3 | A-1 | C-1 | C-2 | C-3 | T-22 | T-1 | T-2 | T-3 | T-23 | T-1 | T-2 | T-3 |
| TIME ZONE TWO CHANNEL SAMPLED | --- | T-1 | T-2 | T-3 | T-22 | T-1 | T-2 | T-3 | --- | --- | --- | --- | --- | --- | --- | --- |
| SWITCH ADDRESSED | SYNC. | A-1 | C-1 | C-2 | C-3 | C-4 | C-5 | C-6 | A-1 | A-2 | C-1 | C-2 | C-3 | C-4 | C-5 | C-6 |
| TIME ZONE THREE CHANNEL SAMPLED | --- | T-4 | T-5 | T-6 | T-7 | T-8 | T-9 | --- | T-22 | T-23 | T-4 | T-5 | T-6 | T-7 | T-8 | T-9 |
| SWITCH ADDRESSED | SYNC. | A-1 | C-1 | C-2 | C-3 | C-4 | C-5 | C-6 | C-7 | A-1 | A-2 | C-8 | C-9 | C-10 | C-11 | C-12 |
|  | T-0 | T-22 | T-10 | T-11 | T-12 | T-13 | T-14 | T-15 | T-16 | T-22 | T-23 | T-17 | T-18 | T-19 | T-20 | T-21 |

ONE SCAN CYCLE (1 ms)

SEISMIC RECORDING APPARATUS HAVING A TIME-VARYING SAMPLE

BACKGROUND OF THE INVENTION

In seismic exploration, a large number of seismic sensor arrays are distributed along the earth's surface. Each sensor array may include from one to more than 30 individual sensors electrically connected together to form a single electrical element. Usually spaced at regular intervals, the arrays are disposed along a desired survey line at increasingly greater distances from a multichannel recording apparatus. The number of sensor arrays may range in number from a few tens to several hundred, depending upon the geological conditions. For many applications, fifty to one hundred such sensor arrays are typical. The distance or spread length between the first sensor nearest the recording apparatus and the most remote array is frequently as much as two miles, although for certain types of exploration problems, the spread may be substantially shorter.

The sensor arrays are connected to the recording apparatus by means of a multiconductor cable or a telemetric link. Each array constitutes a single source of analog singles. The respective arrays are connected to corresponding input channels of the multichannel recording apparatus.

Each input channel includes a preamplifier and a number of filter sections connected in cascade, the output of which is coupled to the corresponding input of a multiplexer switch. The multiplexer switch sequentially connects each channel to common signal processing electronics. The signal processing electronics samples the analog signals from the respective channels that are present on the multiplexer output bus, gain conditions the samples, converts the analog samples to binary numbers, and records the binary numbers on magnetic tape.

Each sequence of connecting each of the respective input channels to the common electronics is termed a scan cycle. The period of time required to complete one scan cycle is the sample interval. The reciprocal of the sample interval or the number of intervals per second is, or course, the sample rate. A sample interval typically ranges from 1 to 4 milliseconds (thousandths of a second). The corresponding sample rate is therefore 1000 to 250 samples per second.

In a seismic survey operation, a recording cycle consists of initiating a seismic impulse or acoustic wave at or near the earth's surface. The energy resulting from the seismic impulse travels downwardly into the earth and is reflected from various subsurface earth layers (strata). The reflected seismic energy returns to the earth's surface where it is detected by the seismic sensor arrays and converted to analog electrical signals. As outlined above, the detected analog signals are filtered, sampled, processed, and recorded. The entire recording cycle lasts from 6 to 10 seconds or more, depending upon the depth of the deepest stratum of interest (depth of penetration) and upon the type of seismic impulse generator used. Assuming 1-millisecond (ms) sample intervals, there would be six to 10 thousand scan cycles per recording cycle.

Many types of seismic impulse generators create energy having a broad frequency spectrum that extends from a few hertz (cycles per second) to several kilohertz (thousands of cycles per second). As is well known to geophysicists, seismic waves in the upper end of the seismic spectrum become attenuated (weakened) as the weaves travel deeper into the earth. The energy loss is due to solid friction in the earth and to scattering by inhomogeneities such as boulders and and fractures in the subsurface strata. Accordingly, seismic energy from relatively shallow strata, 500 to 1000 feet deep, may be rich in high frequencies up to 1 or 2 kilohertz. On the other hand, seismic energy reflected from deep-seated strata is characterized by much lower frequencies in the 10-30 hertz range.

In seismic exploration, the stratigraphic resolution, (the capability of distinguishing two closely spaced strata or earth layers) depends, among other things, upon the frequency of the reflected seismic signals (reflections). Use of relatively high-frequency reflections in the range of 100 to 1000 Hz (hertz) is needed to distinguish between layers that are separated by only a few feet. Stratigraphic resolution of the above-defined degree is required for study of shallow strata in connection with engineering foundation problems, coal exploration, etc. In petroleum exploration, higher resolution is sought at all levels but is more critical at the shallower levels because smaller deposits may be of interest in view of the lower cost of drilling shallower oil wells. Grosser resolution of deep-seated strata may be found to be acceptable. Hence, lower-frequency reflections can be useful for deeper exploration.

As outlined above, the reflected seismic signals are converted to an oscillatory analog wave train by the seismic sensor arrays. In the seismic signal processing and recording apparatus, the analog wave trains are sampled at selected time intervals, converted to binary numbers, and recorded on magnetic tape. At some later time, in a data processing center, the original analog wave trains are reconstructed from the tape-recorded, binary, data samples. In accordance with the well known "Nyquist Theorem," if it is desired to transmit a signal of a predetermined frequency or containing a predetermined band of frequencies, the sampling rate must be at least twice the highest frequency which is to be transmitted. In the course of the sampling process, input frequencies greater than the Nyquist frequency may produce spurious or so-called "alias" low-frequency signals which would be indistinguishable from the desired data signal information. Put another way, the Nyquist Theorem indicates that an oscillatory analog signal must be sampled at least twice during each complete wavelet cycle. If the signal is sampled less than twice each cycle, the reconstructed wavelet may exhibit a frequency that is different from the true frequency and may be otherwise changed in form. That is, the reconstructed frequency assumes a disguise or alias. For example, if a 500-Hz signal were sampled exactly 500 times per second, such as at each positive peak, the signal samples would all have the same value. The reconstructed signal would have "zero" frequency. Accordingly, the original 500-Hz signal must be sampled at least 1000 times per second (1-ms sample intervals) in order preserve the frequency of the original 500-Hz signal. More than two samples per cycle are required to preserve the amplitude of the signal.

The filter cascades discussed above in connection with the preamplifiers include one or more "anti-aliasing" filters or, for brevity, simple "alias filters". The alias filter is designed to sharply attenuate (weaken) all frequencies greater than the alias frequency ($\frac{1}{2}$ the sampling frequency) corresponding to the selected sample rate. Characteristically, the alias filter attenuates frequencies equal to one-fourth the sampling frequency by 3 dB (1.4:1) at the "cutoff frequency", although some manufacturers specify 6 dB (2:1). Frequencies greater than one-half the sampling frequency are attenuated by about 80 dB (10,000:1). In the above example, the cutoff frequency is 250 Hz; at 500 Hz, the signal level is attenuated by nearly 80 dB.

In practical operations, the sample rate is adjusted in accordance with the highest frequency of the seismic signals of interest subject to the capacity of the system. Low-frequency reflections of 20 Hz for example, having a period (time to complete one full cycle) of 50 ms, can be sampled rather coarsely, such as at 4-ms sample intervals. High-frequency reflections of, for instance, 1000 Hz having a period of 1 ms, must be sampled at intervals substantially less than 0.5 ms and preferably less than 0.25 ms.

Any given seismic recording systems will be characterized by a maximum overall sampling rate. That maximum or fastest sampling rate is the maximum rate of the slowest of the various individual subsystems which make up the entire recording system. In most present-day systems it is the tape-recording unit which sets the overall limit, although the analog-to-digital converter is usually selected to have a capacity commensurate with that of the tape recorder. Typical maximum rates in the contemporary art are of the order of 25,000 or 50,000 samples per second.

There is some latitude in selecting the number of channels and the number of samples per second for each channel provided that the product of the two numbers does not exceed the maximum sampling rate of the system. A 100-channel system for example, will have a typical lower limit to the basic multiplexer scan-cycle time of 2 ms, corresponding to a maximum sample rate of 50,000 samples per second.

The typical methods of seismic reflection surveying involve linear arrays of detectors with the seismic source off one end of the line. Accordingly, a substantial time elapses after the shot before useful reflection signals reach the detectors that are most distant from the location of the shot. Thus, only a fraction of the detectors nearer the shot point actually receive useful signals for a certain initial period of time. The number of detectors receiving useful signals increases with increasing elapsed time after the shot, until finally all detectors are usefully active.

Present-day seismic recording equipment used for petroleum exploration provides for two or three, switch-selectable sample intervals, such as 1, 2, 4 ms or 2, 4, 8 ms. An alias filter, appropriate to the sample interval selected, is switched into the output circuit when the sample interval is changed. Once a sample interval has been set, it cannot be changed during a recording cycle. To do so would introduce severe switching transients by injecting a step function into the filters at the time of switch-over which, of course, is intolerable. The step function is due to the high probability that switching will occur at a time that the incoming data signal has a value other than zero.

Conventional petroleum-exploration type recording apparatus can be modified for high-frequency recording by using fewer channels, but only after making substantial, semi-permanent wiring modifications to the apparatus. Once modified, rewiring is required to revert to a coarser sampling interval. Accordingly it is impractical to make such a change between recording cycles, much less within a recording cycle.

Use of a time-varying sampling rate was contemplated and discussed in co-pending applications Ser. Nos. 665,150 and 665,151, assigned to the same assignee. In these applications, use of different-length multiplexer scan-cycle times was suggested. In the above-cited applications, the alias filters were not changed when the sample rate was changed.

As will be discussed in detail later, a spread length that may be suitable for exploration of deep-lying strata is usually too long to properly record reflections from shallow strata. Using existing equipment, there is no way to alter the spread length during a single recording cycle.

SUMMARY OF THE INVENTION

This invention is a multichannel seismic signal processing and recording apparatus that will provide a time-varying sample interval within a single recording cycle. Alias filters are provided, having time-varying cutoff frequencies appropriate to the time-varying sample intervals.

In accordance with a feature of this invention, as the time-varying sample interval is increased, the subsurface coverage of a seismic profile is successively expanded during a recording cycle.

The seismic apparatus includes a number of input channels, such as 100 or more, to which are connected corresponding seismic sensor arrays. Each input channel includes a preamplifier.

At least two groups of addressable mutiplexer switches are connected through an output bus, in time-shared relationship, to a common sample-and-hole module. Separate sets of electrical filters are connected to the inputs of the mutiplexer switch groups. The pass-band of each filter set is tuned to pass seismic signals lying within different desired portions of the spectrum. A portion of the input channels are connected to the filter inputs associated with the first group of multiplexer switches. All of the input channels are connected to the filter inputs associated with the second group of multiplexer switches.

An address encoder such as a programmable read-only-memory (PROM) controls the addressing or selection of the appropriate multiplexer switches at the correct time intervals to provide the desired sample interval. A recording cycle is initiated. For a first period of time, the first group of multiplexer switches are programmed by the PROM to sample half the input channels twice in each scan cycle at a first desired sample interval. At the end of the first period of time, for the remainder of the recording cycle, the PROM disables the first group of multiplexer switches and activates the second group of multiplexer switches to sample all of the input channels once per scan cycle at a second desired sample interval.

In another embodiment of this invention, the seismic recording apparatus includes at least four groups of multiplexer switches, each having an associated set of filters connected to its input terminals. During a single recording cycle, the PROM activates the first group of multiplexer switches to sample for a first time period. one-eighth of the input channels eight times per scan cycle at a first sample interval; for a second time period, the PROM causes the second group of multiplexer switches to sample one-fourth of the input channels four times per scan cycle; for a third time period, the PROM activates only the third group of multiplexer switches to sample one-half the input channels twice per scan cycle;

for the remainder of the recording cycle, the PROM enables only the fourth group of multiplexer switches to sample all of the input channels once per scan cycle. The number of input channels included in the respective groupings, as well as the sampling intervals corresponding to each time period, increase according to a geometric progression with ratio 2.

In accordance with another feature of this invention, an externally programmable Random Access Memory (RAM) may be substituted for the PROM.

In accordance with a feature of this invention, the respective filter sets connected to the multiplexer switch groups include alias filters appropriate to the selected sample interval. The cutoff frequencies of the third, second, and first alias filters may, for example, be respective multiples of the cutoff frequency of the fourth or last alias filter. The multipliers are, of course, greater than unity and may, but not necessarily, increase in accordance with a geometric progression of ratio 2. The cutoff frequency of the fourth or last alias filter is the reciprocal of one-fourth the scan cycle interval. Thus, with a sampling rate of 1,000 samples per second, the Nyquist or alias frequency is 500 Hz, and the cutoff frequency (or 6 dB down point) for the signals at the output of the last alias filter would be 250 cycles.

In accordance with this invention, during a recording cycle, the sampling rate of the channels corresponding to detectors nearest the shot point is maintained at a first high value until the product of the number of channels carrying useful information, multiplied by the sampling rate, reaches a preset limiting value approaching but less than the capacity of the system. At this time the sampling rate is reduced and maintained at the new level until the limit is again reached. The number of different sampling rates used may usefully be two, three, or four, although more may be used without departing from the spirit of the invention.

In accordance with a broad aspect of the invention, first and second sets of alias filters having respectively different cutoff frequencies are provided. A first subgroup of seismic sensor inputs are connected to both of said sets of filters, while a second set of seismic sensor inputs are connected to only the second set of filters, and switching circuitry is provided for sampling the filtered outputs of the first subgroup of inputs at a high sampling rate and subsequently sampling the filtered outputs from all of the sensor inputs at a lower sampling rate.

In accordance with yet another aspect of this invention, the sample rates are varied in random order with respect to selected time zones within a recording cycle.

In one aspect of this invention, one or more auxiliary channels are included with the seismic data channels. The auxiliary channels are sampled at a rate that is independent of the rate at which seismic data channels are sampled.

Advantages of the invention include increased utilization of equipment, increased resolution of at least a portion of the seismic section, and the elimination of electrical transients which would otherwise occur in the course of switching filters in the course of a recording cycle.

BRIEF DESCRIPTION OF THE DRAWINGS

These and other features of this invention will be better understood by reference to the following description, taken in conjunction with the drawings wherein.

DETAILED DESCRIPTION OF THE INVENTION

Figure 1:
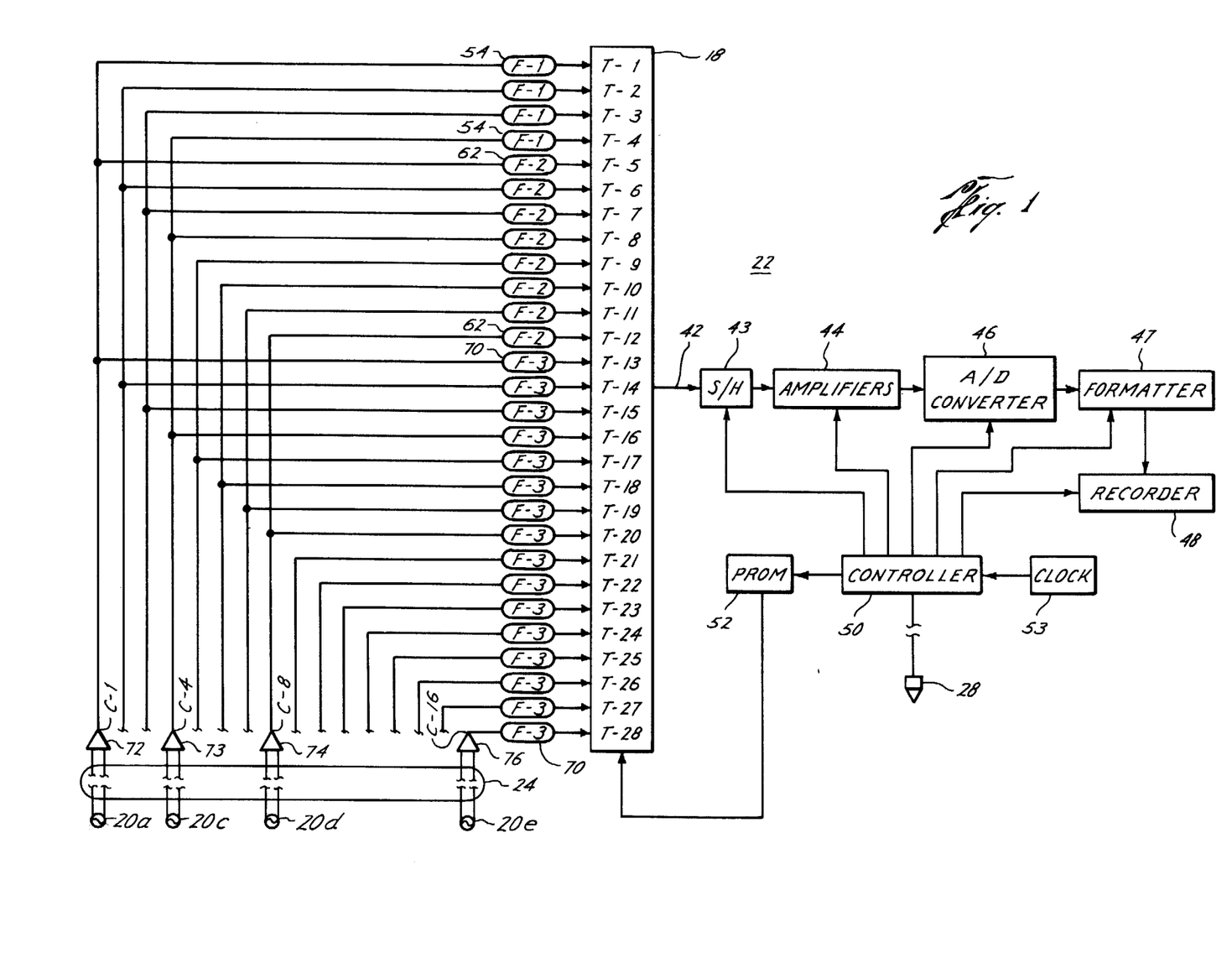
FIG. 1 is a schematic diagram of the apparatus to provide a time-varying sample interval.

Referring to FIG. 1, a number of seismic or sensor arrays 20 are connected to a signal processing and recording apparatus 22 through a multiconductor cable shown generally as 24. In the illustrative system of FIG. 1 there are 16 conductor pairs for channels C1-C16. To avoid undue complexity of the drawings, only four of the 16 conductor pairs and sensor arrays are shown. Of course, a telemetric system could be used in place of the multiconductor cable.

Figures 2, 3:
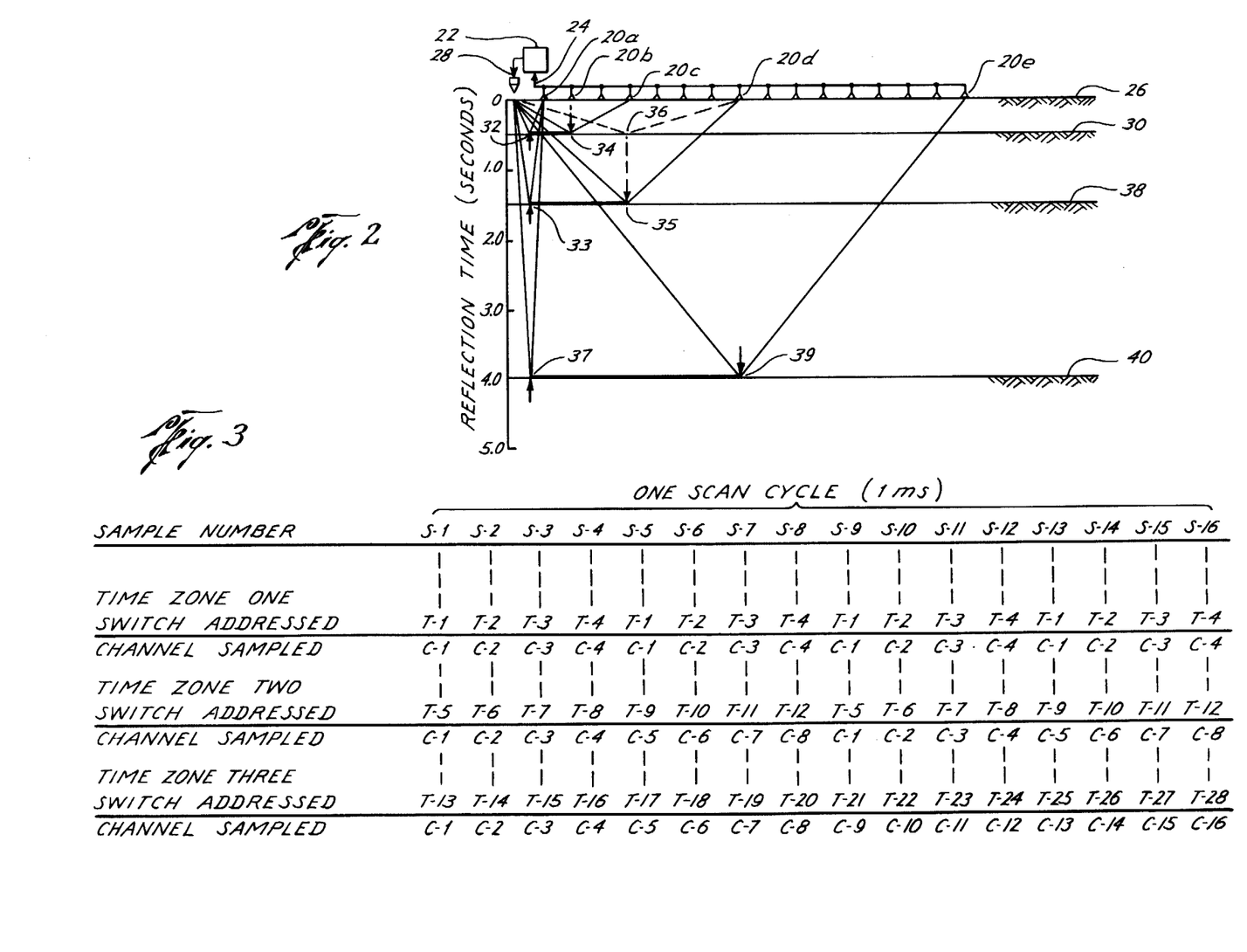
FIG. 2 is a diagram to illustrate time-zoned subsurface coverage.
FIG. 3 shows the multiplexer switch address programs stored in a programmable read-only memory.

The sensor arrays 20a-20e are laid along a desired line of survey over the surface of the earth 26 (FIG. 2), usually at regular intervals, remotely with respect to the signal processing and recording apparatus 22. Although 16 sensor arrays 20 are illustrated in FIG. 1 and 2, virtually any number of such arrays may be used in practice. The 16 sensor arrays, as disposed in FIG. 2, are collectively referred to as a "spread". A seismic impulse generator 28 is shown located at one end of the spread, although generator 28 could equally well be located anywhere along the spread. The distance from generator 28 to the farthest sensor array 20e is termed the "spread length". In practice, the sensor arrays 20 are normally spaced apart 15 to 600 feet. For a 100-array spread, the spread length could be 10 miles or more.

Still with reference to FIG. 2, the spread length must be adjusted in accordance with the depth to strata of interest. For study of a very shallow stratum such as 30, the spread length must be relatively short. The spread length restriction is due to the excessive angularity correction required for the processing of wide-angle reflections. This point is demonstrated in connection with ray paths 28-32-20a and 28-34-20c. Here, although not to scale (the depth coordinate is substantially compressed with respect to the horizontal), the angle between an incident ray 28-34, for example, and the reflected ray 34-20c, is not large. On the other hand, the angle of a hypothetical ray path, such as the dashed lines 28-36-20d, is excessively wide. In fact, the first energy to arrive at array 20d from stratum 30 probably would be refracted through that stratum, rather than being reflected from it, as is well known by geophysicists. Of course, for deeper strata such as 38 and 40, progressively longer spreads are permissible since the angularity between incident and reflected rays decreases as greater depths are penetrated by the seismic waves.

From the above discussion, it can be seen that the subsurface coverage and hence the spread length must be adjusted in accordance with the depth to reflecting strata of interest. The subsurface coverage for stratum 30, using four arrays for example, is defined as the distance from the incident point 32 of a reflected ray to a first sensor array and the incident point 34 of a reflected ray to the last sensor array. For stratum 38, using eight arrays, the subsurface coverage extends from point 33 to point 35; for stratum 40, using sixteen arrays, the coverage extends from point 37 to point 39.

As discussed in earlier paragraphs, shallow reflections are typically rich in high frequencies whereas deeper reflections are characterized by much lower frequencies. Accordingly, a higher sampling rate (shorter sample interval) is needed to faithfully record signals reflected from shallow strata, than is needed to record reflections from deeper layers. Hence, the sample rate should be adjusted in accordance with the depth of the seismic-signal penetration into the earth. Since depth is a function of the reflection travel time and of the average acoustic velocity, the sample rate is adjusted in accordance with specified time zones within a recording cycle. Further, as will be seen later, the subsurface coverage is time zoned in accordance with the sampling rate.

Referring back to FIG. 1, input channels C1–C16 are connected to preamplifiers, such as 72, 73, 74, 76, mounted within the signal processing and recording device 22. Four such preamplifiers are shown for simplicity, but it is to be understood that there is a preamplifier for each channel.

Within device 22 are a number of multiplexer switches having terminals T1–T28, grouped generally as 18. By way of example, but not by way of restriction, three groups T1–T4, T5–T12, T13–T38 are shown. A fraction of the input channels, input channels C1–C4, are connected to a fractional group of switches having terminals T1–T4 of the first multiplexer switch group. A second fraction of the input channels, channels C1–C8, are connected to a fractional group of the eight multiplexer switch terminals, terminals T5–T12 of the second multiplexer switch group, and all of the input channels C1–C16 are connected in sequence to input terminals T13–T28 of the third multiplexer switch group. For brevity, the term "multiplexer switch" will be hereinafter abbreviated simply to "multiplexer".

Inserted in series with the multiplexer input lines are bandpass filters 54, 62, 70, having passbands F1, F2, F3. Each filter/multiplexer may be coupled to more than one preamplifier. The filter/multiplexer combination is sampled at the desired rates with the appropriate filter being installed to correspond with the rate at which the input signals are to be sampled as will be described below. By way of example but not by way of limitation, the passband F-1 of filter 54 could include frequencies between 80 and 1000 Hz; filter 62 might have a passband F-2 of 40–500 Hz; filter 70 would have a passband F-3 of 20–250 Hz. These three filters would be suitable for use with signals to be sampled at intervals of 0.25, 0.5, and 1.0 millisecond respectively.

Each of bandpass filters 54, 62, 70 consists of two filter sections connected in series. The first section is a high-pass filter whose cutoff frequency defines the lower boundary of the passband. The second section is the alias filter whose cutoff frequency delimits the upper boundary of the passband. In some systems, a third filter section is inserted between the high pass and the alias filters. The third filter section is an adjustable low-pass filter which, in combination with the alias filter, may be used to make minor changes in the upper cutoff frequency of the overall bandpass filter.

The above description is exemplary only. A different number of multiplexers could be employed. The filter passbands could be shifted to accommodate other sampling intervals, such as 0.5, 1.0, 2.0 ms. Different low cutoff filters could be used in combination with the same alias filter.

Returning now to FIG. 1, the output bus of the multiplexers is connected to bus 42 and in turn to common signal processing and recording electronics including a sample-and-hold circuit 43, gain conditioning amplifiers 44, analog-to-digital converter (A/D converter) 46, formatter 47 and a recording device 48, such as a magnetic tape recorder. A programmable read-only memory (PROM) 52 controls the sequencing of the multiplexers under the control of a controller 50. Controller 50 also triggers seismic impulse generator 28 to initiate a recording cycle. Each multiplexer switch is addressable and identified by a unique binary address. Three programs are stored in PROM 52. Each program consists of a series of binary numbers that represent the address sequence of the particular multiplexer switches that are to be activated during a given multiplexer scan cycle. For a first time period following initiation of a recording cycle, controller 50 causes PROM 52 to address and activate a first group of multiplexer switches in accordance with the first stored program. For a second time period, other multiplexer switches are addressed in accordance with the second stored program. For the remainder of the recording cycle, a third multiplexer switch group is addressed in accordance with the third stored program. A clocking means 53, acting through controller 50, synchronizes operations of the PROM with the signal processing components such as sample and hold circuit 43, gain conditioning amplifier 44, A/D converter 46, and recording device 48.

In operation, controller 50 triggers seismic impulse generator 28 (external to signal processing apparatus 22) to inject a seismic impulse into the earth, thereby starting a recording cycle. At some slightly earlier time, components 43, 44, 46 are armed and tape recorder 48 is brought up to speed by the controller 50. For a first time period, such as 0.5 second, controller 50 instructs PROM 52 to address multiplexers T1–T4 four times within a 1-ms scan cycle. Reflected signals received by the first four sensor arrays 20a –20c are transmitted to the preamplifiers, such as 72, whence the signals pass through filters 54 to the multiplexer switches T1–T4. As the multiplexer scans channel C1, the signal there present is sampled by sample-and-hold circuit 43. The sample is gain-conditioned and converted by A/D converter 46 to a binary number representative of the signal amplitude at the time of sampling. The binary number is formatted by formatter 47 and is then recorded on tape. As the first multiplexer group is sequenced through a scan cycle, signals in each of the first four input channels, C1–C4 are sampled four times in 1 millisecond to provide an effective sample interval of 0.25 ms.

After the end of the first time zone or period, controller 50 directs PROM 52 to select a sequence of multiplexers according to a second program stored in memory. In accordance with the second program, multiplexers T5–T12 are addressed twice each 1-ms scan cycle to sample the signals from channels C1–C8 at an effective sample interval of 0.5 second for a second time period such as 1.0 second.

Following the end of the second time zone, controller 50 instructs PROM to address multiplexers T13–T28 once per 1-ms scan cycle, for the remainder of the recording cycle. All of input channels C1–C16 are now sampled once per 1-ms scan cycle at 1.0 ms intervals, with channels C9–C16 being sampled for the first time.

From the preceeding discussion, it may be seen that the sample-and-hold circuit 43, as well as the rest of the signal processing modules are time-shared by the multiplexers during a recording cycle.

The above discussion centered around a PROM. In this device, as is well known, once a program has been entered into memory, the program is fixed; it cannot be altered. It is quite possible of course, to employ a Random Access Memory (RAM) in place of a PROM. If used, a RAM would require entry of a program from an external device such as punched cards, punched paper tape or magnetic tape. If the RAM has a volatile memory, the RAM would need to be reprogrammed after every time that the signal processing equipment is turned on after a power-shutdown.

FIG. 3 shows the multiplexer switch address programs that might be stored in the PROM 52 to mechanize the above illustrative system. Multiplexer switch addresses are listed beneath the corresponding signal sample-numbers S1–S16 within each scan cycle. Switch addresses Ti corresponding to three time periods or time zones are shown. Below the switch addresses are listed the channel numbers Ci, sampled. Again assuming a 1-ms scan-cycle interval, the first time period of 500 ms includes scans 1–500 following initiation of a recording cycle; the second time period includes scans 501 to 1500 (1000ms); the last time period includes scans 1501–6000, assuming a 6-second recording cycle. For each time period controller 50 causes PROM 52 to address a different sequence of switches as shown.

It is to be observed that the preamplifiers and alias filters are always connected to the multiplexer circuits. Furthermore, seismic signals are present on all of the input channels C1–C16, all of the time during a recording cycle. But during a given time interval, signals from only those channels connected to a particular set of multiplexers are actually sampled and processed. When it is desired to change the number of inputs to be sampled as well as the sample rate, a different set of multiplexer switches is activated. Since the alias and other filters are not switched in or out of the circuit, no switching transients can occur when changing sample rates. Controller 50 can be programmed to provide selectable time zones during which the different sample rates are enabled. In one embodiment by way of example, the length of each time zone is selectable to the nearest even 100 ms after a recording cycle is initiated. It is to be observed that the number of data samples per scan remains constant (16 samples per scan in the exemplary system) regardless of the sample interval.

From the above description, considering in order the first, second, and third multiplexer switch groups addressed by the PROM, the number of input channels serviced within each time zone is 4, 8, 16, respectively. The series of numbers is recognized as a geometric progression having a ratio of 2 between terms. The limit to the series is, of course, the total number of channels in the system. The data sample intervals increase similarly with the limiting interval being equal to the basic multiplexer scan interval. Half of the multiplexer switches and filters in each group after the first, have connected to them all of the input channels included in the previous (smaller) switch group.

In the illustrative system, the time-varying sample intervals increase from the shortest to the longest intervals. There is no reason why, for special applications, the sample interval should not be varied from longer to shorter intervals or from a shorter to a longer and then to an intermediate sample interval.

The cutoff frequency of the alias filter associated with the last set of multiplexers is normally defined by the basic scan-cycle interval. For a 1-ms interval, the cutoff frequency is 250 Hz. The cutoff frequencies for the alias filters associated with the second and first multiplexers are multiples of the cutoff frequency of the alias filter associated with the last multiplexer. The multipliers are not, however, necessarily integers. The cutoff frequencies of the alias filters associated with the second and first multiplexers may be 500 to 1000 Hz respectively. In this case, the upper cutoff frequency is an integral 2:1 multiple of the next lower cutoff frequency. In certain applications however, the upper cutoff frequencies of one set of alias filters may be only half an octave apart. Thus in one embodiment of this invention, the respective upper cutoff frequencies might be 250 Hz, 500 Hz, 750 Hz. The highest alias frequency is thus 1.5 times the next lower frequency of 500 Hz.

In the previously-discussed illustrative system, the multiplexer switches were addressed sixteen times to obtain sixteen data samples during each scan cycle. Within any given time period or time zone during a recording cycle, the signals from all of the channels involved were sampled at the same sample rate.

In a typical seismic system there may be one or more auxiliary channels. One auxiliary channel may be used to record a pulse called the "time break" which marks the instant of initiation of a seismic impulse. Another auxiliary channel may be used to record an external timing reference, etc. Generally, it is preferable to sample the auxiliary channels at a constant rate during the recording cycle, independently of the time-varying seismic-data sampling rate.

When the signal samples, acquired from the data and auxiliary channels during each scan cycle, are recorded on tape, the beginning of the scan is identified by a unique binary number code called a "start-scan indicator" or "sync mark". Although the sync mark does not represent a signal sample, it must be treated as one of the samples that comprise a complete scan because it must occupy the same period of time as any other sample. The sync mark is generated externally to the multiplexer switches, in formatter 47, by means well known to the art. However, a pseudo-channel such as a dummy multiplexer switch T0 (FIG. 5) must be provided to allow the required time slot for generation and recording of the sync mark at the beginning of a scan cycle.

Figure 4:
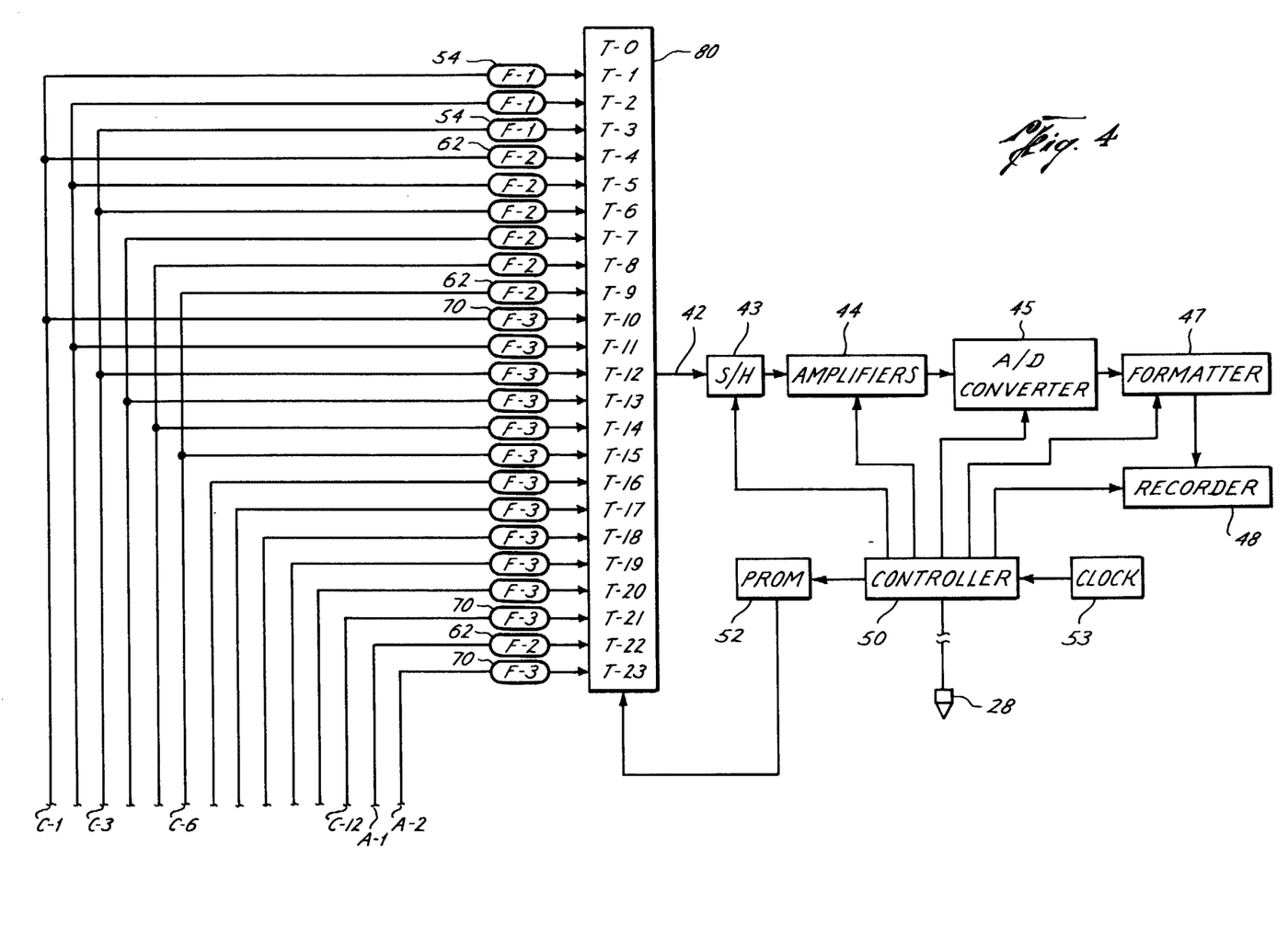
FIG. 4 is a schematic diagram showing a means for sampling auxiliary channels at a rate that is independent of the seismic data channel sample rate.

Since the total number of samples acquired per scan is limited (in the exemplary system, sixteen samples), addition of the sync mark and two auxiliary channels reduces the number of seismic data channels that can be accomodated. FIG. 4 illustrates a system having a capacity for twelve seismic data channels, C1–C12 and two auxiliary channels A1, A2, employing a set of 24 multiplexer switches T0–T23 shown generally as 80. The seismic data channels C1–C12 are to be sampled at a time-varying sample rate as before; auxiliary channel A1 is to be sampled at a constant sample rate of two samples per scan, while auxiliary channel A2 is to be sampled once per scan throughout the entire recording cycle. Alias filters appropriate to the sampling rate for each channel are provided as shown.

Figure 5:
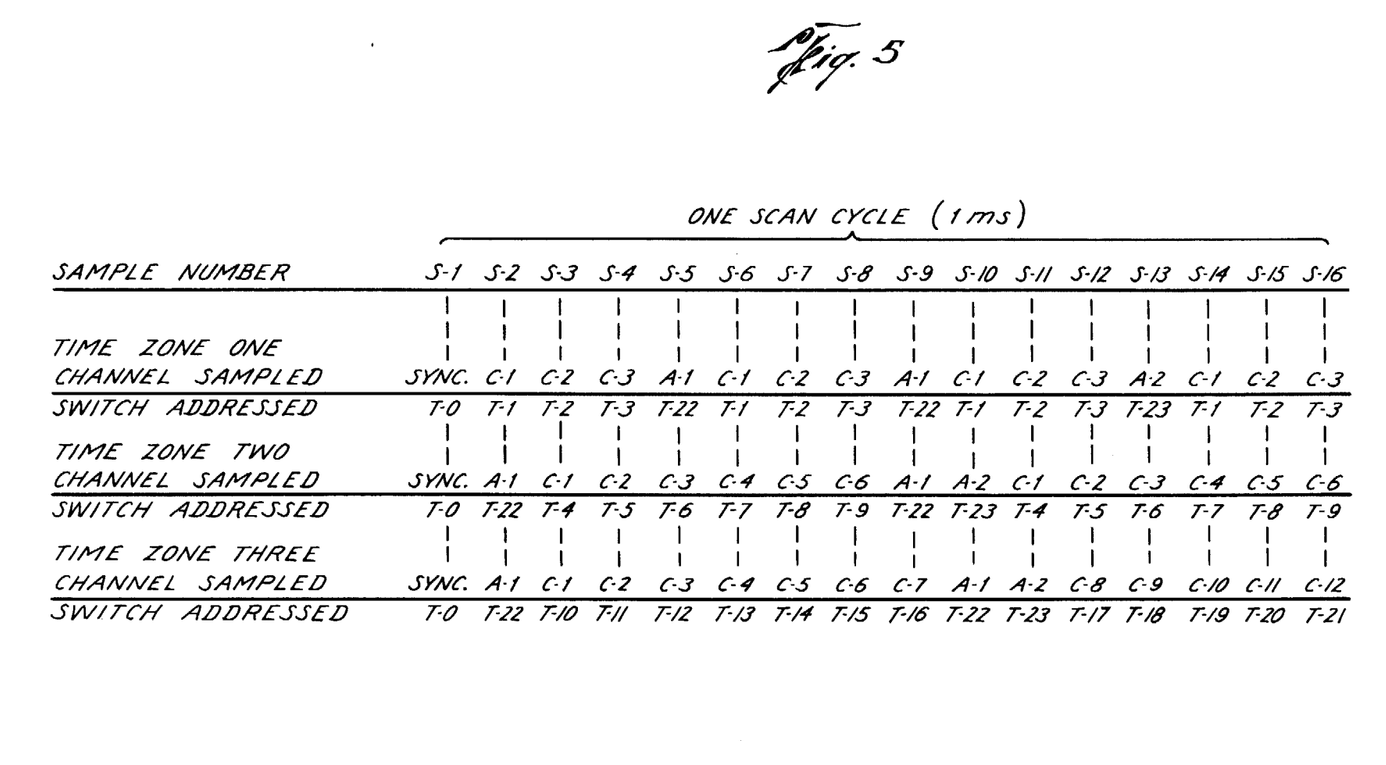
FIG. 5 shows the multiplexer switch address sequence required to sample the auxiliary channels at a rate that is independent of the seismic data channel sample rate.

FIG. 5 shows the switch address sequences that are stored in PROM 52, corresponding to the three time zones into which a recording cycle is divided. Thus, for the first time zone, channels C1–C3 are sampled four times, A1 is sampled twice and A2 is sampled once per scan cycle, providing a total of sixteen samples including the sync mark. For time zone two, channels C1–C6 and A1 are sampled twice, and auxiliary channel A2 is sampled once per scan cycle. For the remainder of the recording cycle, channels C1–C12 and A2 are sampled once per scan cycle and A1 is again sampled twice per scan cycle. By use of the address sequences stored in PROM 52, shown in FIG. 5, the auxiliary channels are sampled at rates that are independent of the time-varying, seismic-data sampling rate.

The multiplexer switch addresses listed in the figures are shown in decimal notation. As stored in the PROM, these addresses are encoded in binary notation.

From the above description of the system operation, taken in conjunction with FIG. 2, it can further be appreciated that the subsurface coverage is expanded in accordance with the time-varying sample interval, as additional channels are sampled within each time zone of the recording cycle.

The illustrative apparatus above described is presented by way of example. The number of channels, the number of multiplexers or multiplexer switch groupings, the scan-cycle length, the number of auxiliary channels, and effective sampling intervals or rates may be altered without departing from the teachings of this invention.

What I claim is:

1. A multichannel seismic signal processing and recording apparatus comprising:
   a plurality of input channels for receiving seismic signals;
   a plurality of seismic sensor means for applying seismic signals to said input channels;
   means for initiating a seismic impulse at a predetermined location and for initiating a recording cycle;
   filter means for differently filtering the seismic signals from different sets of said input channels at different times during said recording cycle; and
   means for sampling differently filtered seismic signals at correspondingly different sample rates during said recording cycle.

2. The apparatus as defined by claim 1 wherein:
   said different filtering means include a first filter means having a first passband connected to a subgroup of said input channels and second filter means having a second passband connected to all of said input channels.

3. The apparatus as defined by claim 1 including:
   means for establishing an input-channel scan cycle at desired time intervals;
   first means for scanning and sampling the filtered signals from said subgroup of said signal input channels more than once per scan cycle during a first time portion of said recording cycle; and
   at least a second means for scanning and sampling the filtered signals from all of said signal input channels once per scan cycle during a second time portion of said recording cycle.

4. The apparatus as defined by claim 3 wherein:
   said first and second scanning and sampling means include first and second multiplexer switch groups, connected in parallel through an output bus, in time-shared relationship, to a common sample-and-hold circuit.

5. The apparatus as defined in claim 2 wherein:
   said first and second filtering means include electrical alias filters, the upper cutoff frequency of said first alias filter being a multiple having a multiplier greater than unity of the upper cutoff frequency of said second alias filter.

6. The apparatus as defined in claim 4 including:
   common signal processing and recording electronics coupled to said output bus.

7. The apparatus as defined by claim 3 including:
   means for addressing and enabling said first group of multiplexer switches during a first time portion of the recording cycle and for addressing and enabling said second group of multiplexer switches and disabling said first group of multiplexer switches for the remainder of said recording cycle.

8. The apparatus as defined by claim 3 wherein:
   said first scanning and sampling means includes means for sampling said filtered signals from half the input channels twice each scan cycle for a first time portion of said scan cycle.

9. The apparauts as defined by claim 7 wherein:
   said addressing and enabling means is a PROM.

10. The apparatus as defined in claim 2 wherein:
    a preamplifier is included in each input channel.

11. The apparatus as defined in claim 1 wherein:
    said filter means includes several sets of electrical alias filters, each set having a different upper cutoff frequency connected to several corresponding subgroups of input channels, each of the several subgroups including a different number of input channels; and
    said sampling means includes several groups of multiplexer switch means having a common output bus, for sampling the respective differently-filtered signals from the several subgroups of input channels at different submultiples of the multiplexer scan-cycle interval, each of the different submultiples being associated with a different time zone within the recording cycle.

12. The apparatus as defined in claim 11 including:
    means for serially addressing and enabling, one at a time, the switches included in said several groups of multiplexer switches in accordance with a desired sequence during a recording cycle.

13. The apparatus as defined by claim 11 wherein:
    the number of input channels included in each of the several respective subgroups increase according to a geometric progression of ratio 2, the limiting number of channels being the total number of input channels in the system; and
    the submultiple sample intervals increase according to a geometric progression of ratio 2, the limiting interval being the multiplexer scan cycle interval, there being a designated submultiple sample interval associated with a corresponding input-channel subgroup.

14. The apparatus as defined by claim 13 wherein:
    each of the several input channel subgroups after the first, includes as half of its members, all of the input channels of the group that includes the next smaller number of channels.

15. The apparatus as defined in claim 14 wherein:
    common circuitry is connected to the common output bus of the several groups of multiplexer switches, said common circuitry including signal-processing electronics and a recording device, said groups of multiplexer switches time-sharing said common circuitry under control of said addressing and enabling means.

16. The apparatus of claim 3 wherein:

a plurality of seismic sensor arrays are coupled to said plurality of input channels by a multichannel signal transmission link, said sensor arrays being deployed along a desired line remotely from said signal processing and recording apparatus; and wherein the seismic sensor arrays associated with said first subgroup of input channels are located toward one end of said signal transmission link nearest the location of said seismic impulse whereby the subsurface coverage during the second time portion of said recording cycle, when all of said input channels are being sampled, is expanded with respect to the subsurface coverage during the first time portion thereof when only signals from said subgroup of input channels is being sampled.

17. The apparatus as defined in claim 5 wherein; said multiplier is equal to 2.

18. The apparatus as defined in claim 5 wherein: said multiplier is less than 2.

19. A seismic signal processing and recording apparatus for initially sampling signals from seismic sensors close to a seismic impulse point at a high sampling rate, and then sampling signals along an entire spread of seismic sensors at a reduced sampling rate, comprising:

a first plurality of seismic input channels;

a second plurality of seismic input channels;

a first set of seismic alias filters each having a first predetermined cut-off frequency;

a second set of seismic alias filters each having a predetermined cut-off frequency which is substantially lower than said first predetermined cut-off frequency;

means connecting said first plurality of input channels both to said first set of seismic alias filters and also to the second set of seismic alias filters;

means connecting said second plurality of seismic input channels to said second set of seismic alias filters; and switching means for sampling the outputs from said first plurality of seismic input channels as filtered by said first set of alias filters at a high sampling rate, and for subsequently sampling both said first and second pluralities of seismic input channels as filtered by said second set of alias filters at a lower sampling rate, whereby a high resolution section is initially obtained near the seismic impulse point, and a lower resolution section of greater subsurface extent is subsequently obtained.

20. The apparatus defined by claim 19 including:

at least one auxiliary input channel;

auxiliary alias filter means having a predetermined cutoff frequency;

means connecting said auxiliary alias filter means to said auxiliary input channel; and switching means for sampling the output from said auxiliary channel as filtered by said auxiliary alias filter means, at a sampling rate that is independent of the sampling rate of said seismic input channels.

21. The apparatus as defined by claim 6 wherein:

said addressing and enabling means is an externally-programmable RAM.

22. The apparatus as defined by claim 12 wherein:

said address and enabling means is a PROM.

23. The apparatus as defined by claim 12, wherein:

said addressing and enabling means is an externally programmable RAM.

* * * * *